(12) United States Patent
Horita

(10) Patent No.: US 7,066,492 B2
(45) Date of Patent: Jun. 27, 2006

(54) IMPACT FORCE RELIEVING STRUCTURE IN STEERING DEVICE OF CAR

(75) Inventor: Kosaku Horita, Ikeda (JP)

(73) Assignee: Daihatsu Motor Co., Ltd., Osaka (JP)

( * ) Notice: Subject to any disclaimer, the term of this patent is extended or adjusted under 35 U.S.C. 154(b) by 66 days.

(21) Appl. No.: 10/496,120

(22) PCT Filed: Jan. 30, 2003

(86) PCT No.: PCT/JP03/00942

§ 371 (c)(1),
(2), (4) Date: May 19, 2004

(87) PCT Pub. No.: WO03/066412

PCT Pub. Date: Aug. 14, 2003

(65) Prior Publication Data

US 2004/0262904 A1    Dec. 30, 2004

(30) Foreign Application Priority Data

Feb. 7, 2002    (JP) ............................. 2002-031447

(51) Int. Cl.
*B62D 1/11*    (2006.01)
(52) U.S. Cl. .................. 280/777; 280/779; 280/93.502
(58) Field of Classification Search ................ 280/777, 280/779, 780, 93.502, 93.51, 93.513; 296/187.03, 296/187.09; B62D 1/19
See application file for complete search history.

(56) References Cited

U.S. PATENT DOCUMENTS 5,653,146 A * 8/1997 Barton ........................ 74/492

2003/0173764 A1 * 9/2003 Lutz ........................... 280/777

FOREIGN PATENT DOCUMENTS

| JP | 99451/1973 | 5/1975 |
| JP | 57-171964 | 10/1982 |
| JP | 34938/1990 | 12/1991 |

(Continued)

OTHER PUBLICATIONS

Copy of International Search Report.

(Continued)

*Primary Examiner*—David R. Dunn
*Assistant Examiner*—Drew J. Brown
(74) *Attorney, Agent, or Firm*—Michael Bednarek; Pillsbury Winthrop Shaw Pittman LLP

(57) ABSTRACT

A steering device (20) for an automobile (1) comprises a steering shaft (23) supporting a steering wheel (24), a steering gear device (26) disposed rearwardly of the lower end of the steering shaft (23), and an operative connection gear device (28) disposed forwardly of the steering gear device (26), supported by the car body (2) through a bracket (27) and adapted to operatively connect the steering gear device (26) to the lower end of the steering shaft (23). The bracket (27) comprises a front frame (36) constituting the front of the bracket (27) and supported at the front end thereof by the car body (2), the rear side thereof extending rearwardly downward, and a rear frame (38) constituting the rear of the bracket (27) and rearwardly extending from the rear end of the front frame (36), the rear end thereof being supported by the car body (2), with the operative connection gear device (28) being supported by the rear frame (38). When the automobile (1) comes into primary collision to deform the bracket (27), the front frame (36) of the bracket (27) is bent with respect to the rear frame (38) so as to assume a vertical attitude.

2 Claims, 5 Drawing Sheets

FOREIGN PATENT DOCUMENTS

| | | |
|---|---|---|
| JP | 4-46866 A | 2/1992 |
| JP | 6-263041 A | 9/1994 |
| JP | 06263041 A * | 9/1994 |
| JP | 8-156827 A | 6/1996 |
| JP | 11-278286 A | 10/1999 |
| JP | 11278286 A * | 10/1999 |

OTHER PUBLICATIONS

Copy of International Search Report Mar. 18, 2003.

* cited by examiner

IMPACT FORCE RELIEVING STRUCTURE IN STEERING DEVICE OF CAR

TECHNICAL FIELD

The present invention relates to a shock mitigating structure for an automobile steering device, which, when an automobile comes into primary collision with some object ahead, followed by a secondary collision of the driver with the steering column, which then imparts a shock to the driver, mitigates such shock.

BACKGROUND ART

Such automobile steering device is disclosed in Japanese Utility Model Unexamined Publication Sho 57-171964, particularly in FIG. 3 thereof.

According to said publication, the steering device comprises a steering shaft disposed in the front of the car interior and supported by the car body for rotation around its own axis extending rearwardly upward, steering wheel supported on the upper end of the steering shaft, a steering gear device disposed rearwardly of the lower end of said steering shaft, supported by said car body and operatively connected to right and left steering-purpose wheels, and an operative connection gear device disposed forwardly of said steering gear device and supported by the car body through a bracket and adapted to operatively connect said steering gear device to the lower end of said steering shaft.

Further, the operative connection gear device comprises a gear case constituting the outer shell thereof and supported by said bracket, an input gear housed in the gear case and operatively connected to the lower end of the steering shaft, and an output gear housed in the gear case and meshing with said input gear. Said steering gear device operatively is connected to the output gear by an universal joint shaft.

And when the driver positioned rearwardly of said steering wheel operates the steering wheel, the operating force is transmitted to the right and left steering-purpose wheels successively through said steering shaft, operative connection gear device input gear, output gear, universal joint shaft and steering gear device; thus, the automobile is steered in a desired direction.

In this connection, when primary collision of the automobile causes the front of the car body to move rearward with respect to the rear of the car body while it is plastically deformed successively from its front end to the rear, the operative connection gear device is pushed by the front of the rearwardly moving car body, so that it also moves rearward and sometimes pushes up the steering shaft rearwardly upward, in which case there is presented the possibility of said steering wheel approaching the driver.

And if the steering wheel approaches the driver as described above, the driver, upon primary collision, tends to come into secondary collision with the steering wheel from rearwardly above, which may produce a possibility that the shock to be applied to the driver upon secondary collision is unnecessarily great.

Further, in the prior art described above, the universal joint shaft is disposed to extend rearwardly downward. Therefore, when said operative connection gear device and said universal join shaft, pushed by the front of the car body, are successively rearwardly moved upon primary collision, as described above, the front side of the universal joint shaft tends to turn rearwardly upward substantially around the connecting section between the rear end of the universal joint shaft and the steering gear device.

And when the universal joint shaft turns rearwardly upward, as described above, the operative connection gear device connected to the front end of said universal joint shaft also turns rearwardly upward. Thereupon, the operative connection gear device pushes up the steering shaft rearwardly upward, as described above, to cause the steering wheel to approach the driver, which may produce a possibility that the shock to be applied to the driver upon secondary collision is unnecessarily great.

The present invention, which has been accomplished with the above in mind, is intended to solve the problem of mitigating the shock to be applied from the steering wheel to the driver upon secondary collision of the driver with the steering wheel from rearwardly above upon primary collision of the automobile.

DISCLOSURE OF THE INVENTION

The invention is such that in an automobile steering device comprising a steering shaft disposed in the front of the car interior, supported by the car body for rotation around its own axis extending rearwardly upward, and supporting a steering wheel on the upper end thereof, a steering gear device disposed rearwardly of the lower end of said steering shaft, supported by said car body and operatively connected to right and left steering-purpose wheels, and an operative connection gear device disposed forwardly of the steering gear device, supported by the car body through a bracket, and adapted to operatively connect said steering gear device to the lower end of said steering shaft, said bracket comprises a front frame constituting the front of the bracket and supported at the front end thereof by said car body, the rear side thereof extending rearwardly downward, and a rear frame constituting the rear of said bracket and rearwardly extending from the rear end of said front frame, the rear end thereof being supported by said car body, with said operative connection gear device being supported by the rear frame.

Further, another invention is such that in an automobile steering device wherein said operative connection gear device comprises a gear case constituting the outer shell thereof and supported by said rear frame, an input gear housed in the gear case and operatively connected to the lower end of the steering shaft, and an output gear housed in the gear case and meshing with said input gear, a universal joint shaft for operatively connecting said steering gear device to the output gear is provided, the axes of said output gear and universal joint shaft cross each other in a valley fold manner as seen in a side view of the car body, and the universal joint shaft is disposed to extend rearwardly upward.

Further, another invention is such that a dropout accelerating means is provided for accelerating dropout of the rear end of the bracket from the car body when an external force of more than a predetermined value is applied to the bracket from ahead.

BEST MODE FOR CARRYING OUT THE INVENTION

In order to describe the invention in more detail, it will be described with reference to the accompanying drawings.

Figure 1:
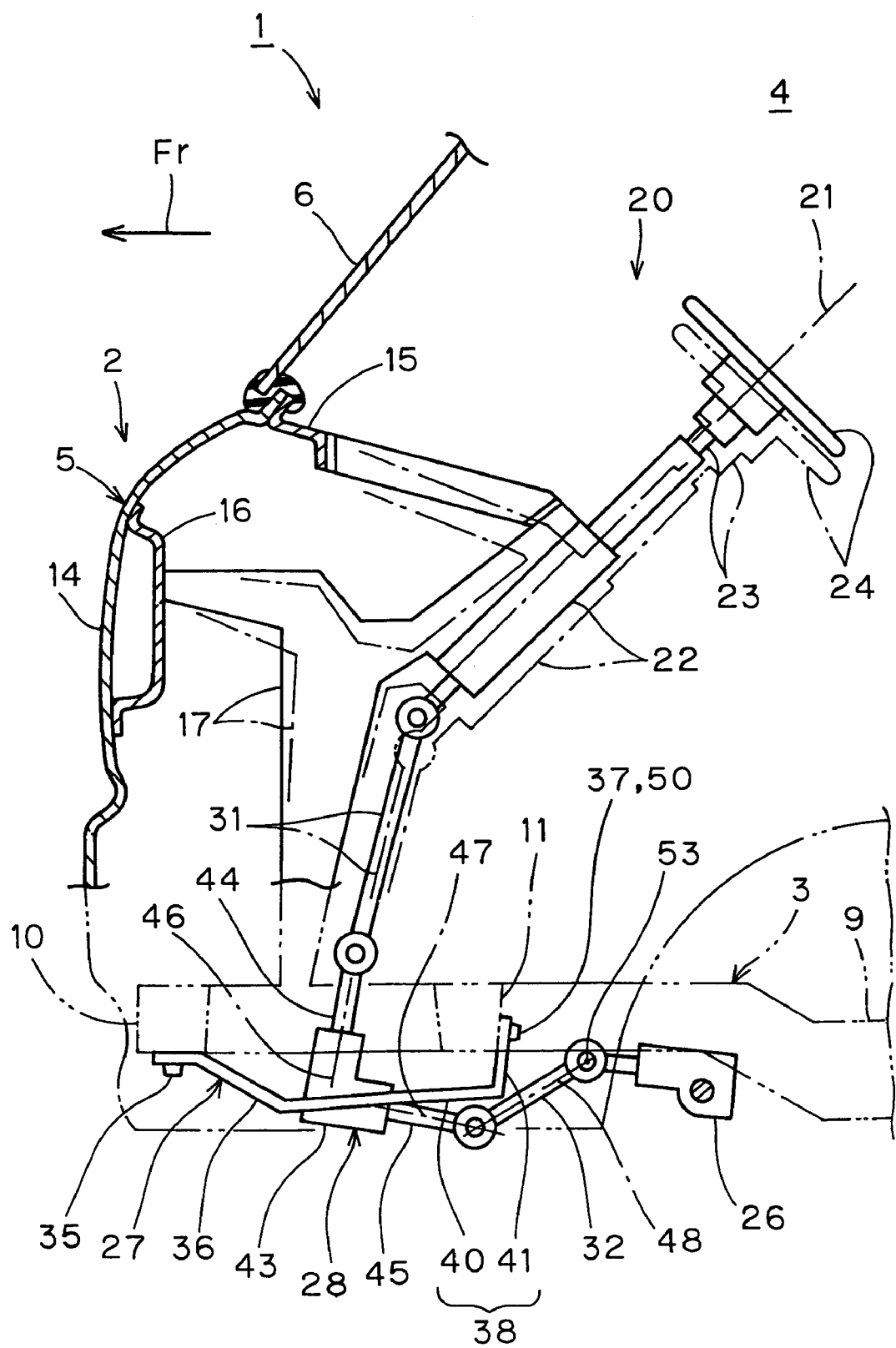
FIG. 1 is a side view, in section, of the front of an automobile.
Figure 2:
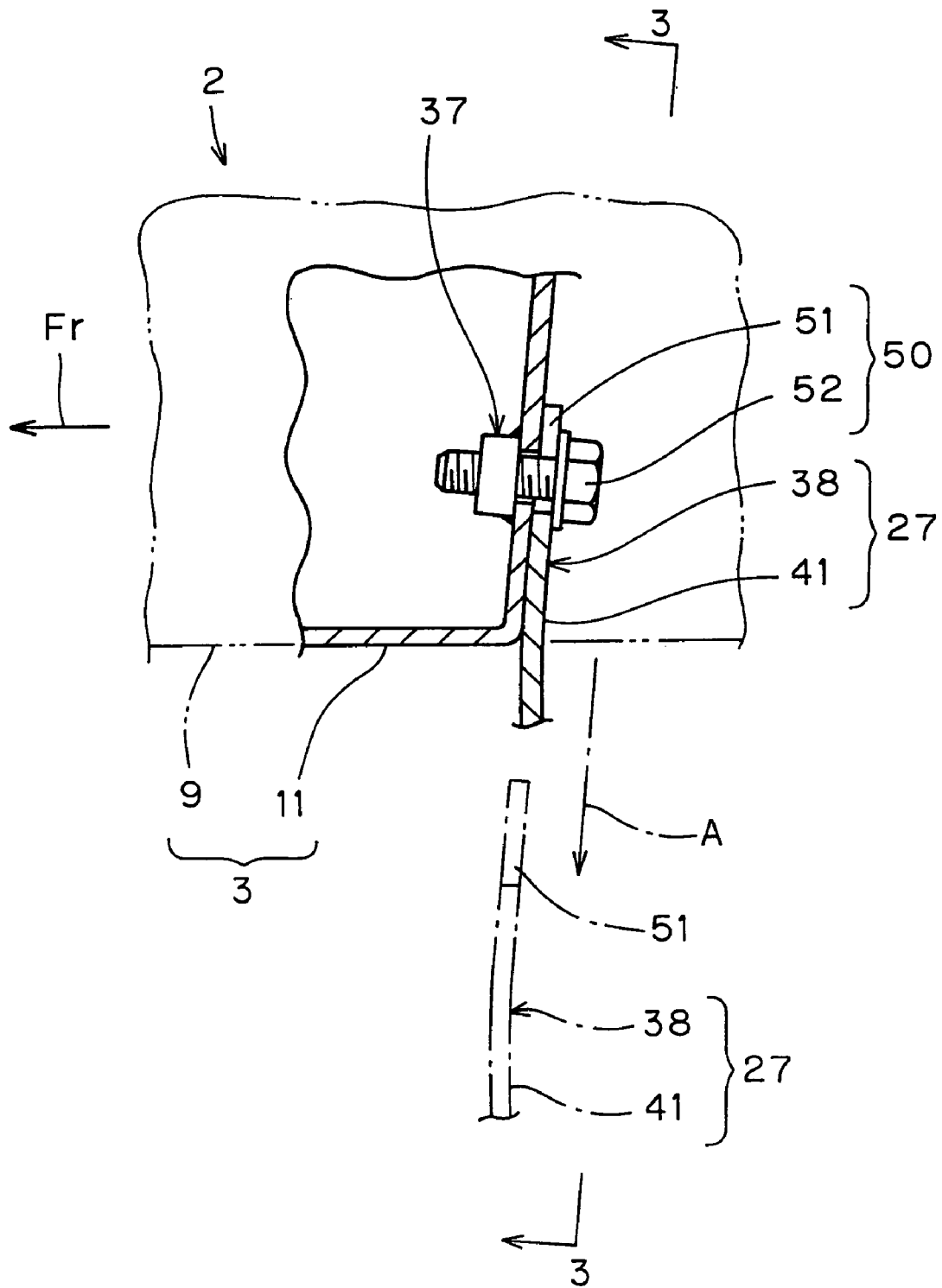
FIG. 2 is a fragmentary enlarged view, in section, of FIG. 1.
Figure 3:
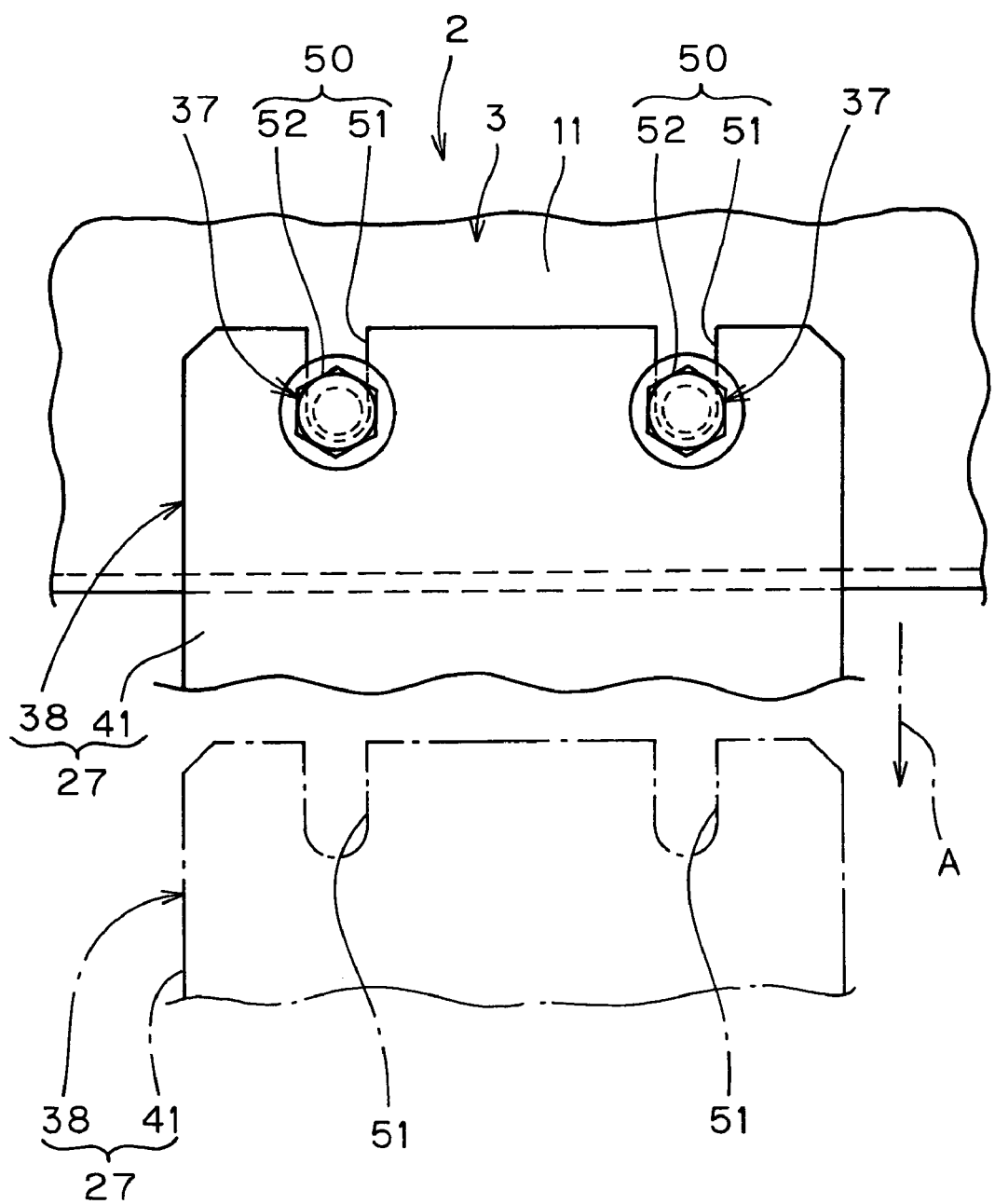
FIG. 3 is a view taken in the direction of arrow 3—3 in FIG. 2.

In FIGS. 1–3, the numeral 1 denotes a station wagon type automobile, and the arrow Fr indicates the forward direction of the automobile 1.

The car body 2 of the automobile 1 is made of sheet metal, and comprises a car body frame 3 constituting the lower portion thereof and having high strength and rigidity, and a car body main body 5 disposed on the upper side of, and supported by, the car body frame 3, with its inner space defining a car interior 4, and a front window 6 is disposed in the upper portion of the front end of the car body main body 5.

The car body frame 3 comprises a pair of right and left side frames 9 extending longitudinally of the automobile 1, a cross member 10 interconnecting the front ends of the right and left side frames 9, and another cross member 11 disposed rearwardly of the cross member 10 to interconnect the intermediate portions, as seen longitudinally of the automobile 1, in the front portions of said right and left side frames 9. A pair of right and left steering-purpose front wheels is suspended in the front portion of said car body frame 3, and a pair of right and left rear wheels are suspended in the rear of the car body frame 3, these wheels supporting the car body 2 on a road surface.

The front of said car body main body 5 constituting the front of said car body 2 comprises a front surface plate 14 constituting the lower portion of the front end of the car body main body 5, a front cowl 15 connected to the upper edge of the front surface plate 14 to reinforce the latter, a reinforcing panel 16 connected to the vertically intermediate portion of said front surface plate 14 to reinforce the latter, a unillustrated floor panel constituting the lower portion of the car body main body 5, and a pedal bracket 17 disposed in the front of said car interior 4 and supported so that it is carried on the car body frame 3, front cowl 15 and reinforcing panel 16, and supporting unillustrated accelerator and brake pedals.

A steering device 20 is disposed in the front of the car interior 4.

The steering device 20 comprises a steering column 22 disposed in the front of the car interior 4, having a rearwardly upwardly extending axis 21, and supported by the pedal bracket 17, a steering shaft 23 fitted in and supported by the steering column 22 so as to be rotatable around the axis 21, and a steering wheel 24 fixedly supported on the upper end of the steering shaft 23.

Further, said steering device 20 further comprises a steering gear device 26 that is a rack gear device disposed rearwardly of the lower end of said steering shaft 23, firmly supported by the car body frame 3 of the car body 2, and operatively connected to said right and left steering-purpose front wheels, an operative connection gear device 28 supported by the car body frame 3 of the car body 2 through a bracket 27 forwardly of the steering gear device 26 and downwardly of the lower end of the steering shaft 23, an universal joint shaft 31 for operatively connecting the operative connection gear device 28 to the lower end of said steering shaft 23, and another universal joint shaft 32 for operatively connecting the steering gear device 26 to the operative connection gear device 28.

The bracket 27, which is made of sheet metal, comprises a front frame 36 constituting the front of the bracket 27 and supported at the front end thereof by being fastened to the cross member 10 by a fastener 35, the rear thereof extending rearwardly downward, and a rear frame 38 constituting the rear of said bracket 27 and rearwardly extending integrally from the rear end of said front frame 36, the rear end thereof being supported by being fastened to said another cross member 11 by a fastener 37.

Further, said rear frame 38 comprises a horizontal frame 40 constituting the front of said rear frame 38 and substantially horizontally and rearwardly extending integrally from the rear end of said front frame 36, and a vertical frame 41 constituting the rear of said rear frame 38 and rearwardly upwardly extending integrally from the rear end of said horizontal frame 40, the extended end thereof being fastened to said another cross member 11 by said fastener 37. Said operative connection gear device 28 is supported by the horizontal frame 40 in the vicinity of the rear of the front frame 36.

The operative connection gear device 28 is a bevel gear device. This operative connection gear device 28 comprises a gear case 43 constituting the outer shell thereof and supported by the horizontal frame 40, an input gear 44 housed in the gear case 43 and operatively connected to the lower end of the steering shaft 23 through said universal joint shaft 31, and an output gear 45 housed in the gear case 43, meshing with said input gear 44, and operatively connected to the steering gear device 26 through said another universal joint shaft 32.

The input gear 44 and output gear 45 are bevel gears. The axis 46 of the input gear 44 extends substantially vertically and rearwardly upward, while the axis 47 of said output gear 45 extends substantially horizontally and rearwardly downward so as to be substantially orthogonal to the axis 46 of said input gear 44.

The output gear 45 is connected to the front end of another universal joint shaft 32 in such a manner that the axis 47 of said output gear 45 crosses the axis 48 of said another universal joint shaft 32 in a valley fold manner as seen in a side view (FIG. 1) of the car body 2. Further, said another universal joint shaft 32 is disposed so that the axis 48 of said another universal joint shaft 32 extends rearwardly upward.

A dropout accelerating means 50 is provided for accelerating downward dropout of the rear end of the bracket 27 from said another cross member 11 when an external force of more than a predetermined value is applied to the bracket 27 from ahead. The dropout accelerating means 50 comprises a plurality of (or a pair of) notches 51 formed in the upper end edge of the rear end of the bracket 27, and fastener bolts 52 for fastening the edges of the notches 51 to said another cross member 11, the arrangement being such that when said external force is applied to said bracket 27, the rear end of said bracket 27 is allowed to drop out, as at A, from said fastener bolts 52 (in alternate long and short dashed lines in FIGS. 2 and 3).

According to the above arrangement, the bracket 27 comprises the front frame 36 constituting the front of the bracket 27 and supported at the front end thereof by said car body 2, the rear side extending rearwardly downward, and the rear frame 38 constituting the rear of said bracket 27, rearwardly extending from the rear end of said front frame 36, and supported at the rear end thereof by said car body 2, with said operative connection gear device 28 being supported by the rear frame 38.

Figure 4:
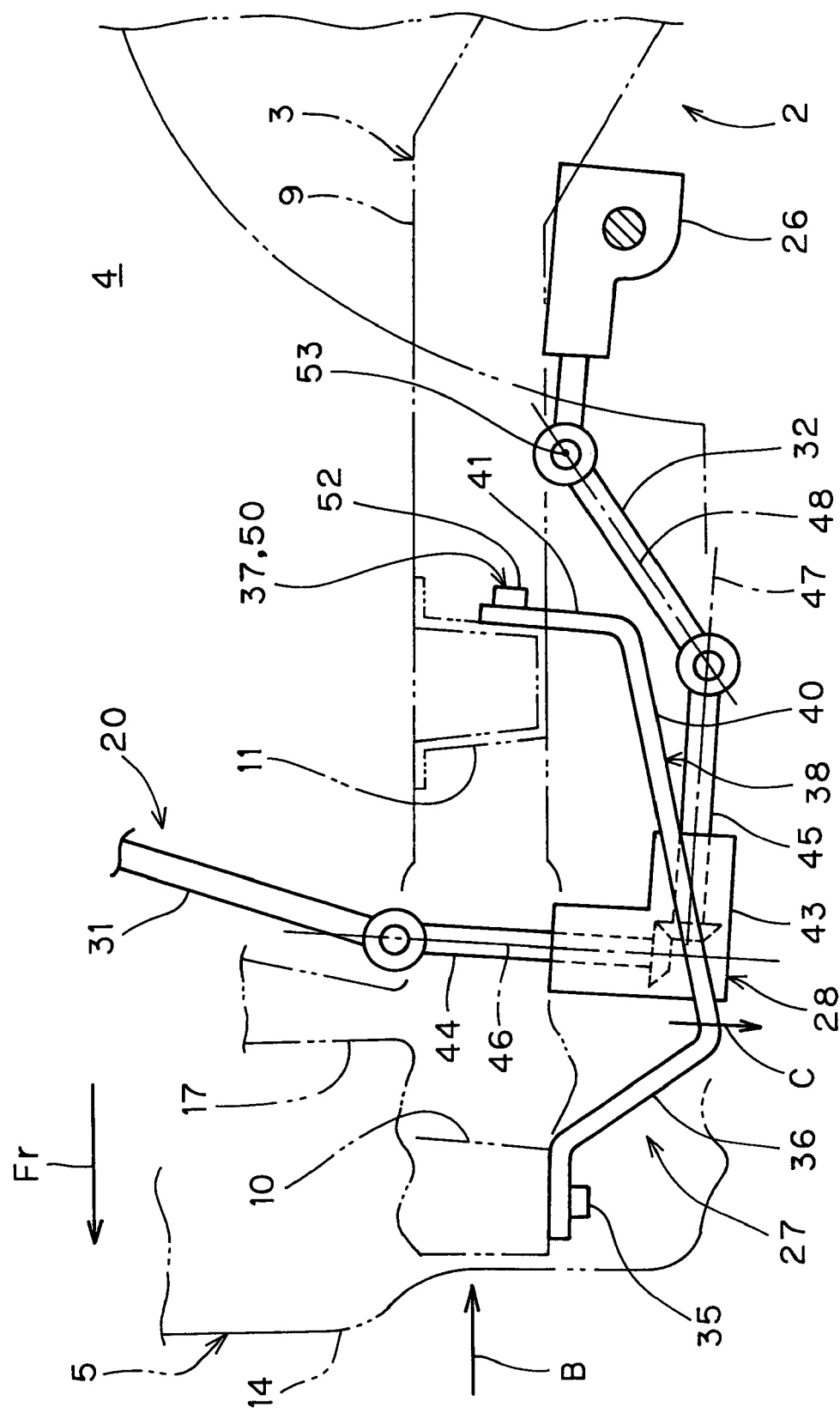
FIG. 4 is a view for explanation of an action, corresponding to fragmental enlargement in FIG. 1.

Therefore, as shown in FIG. 4, when the automobile 1 comes into primary collision to deform the front of the car body 2 so as to cause it to perform the rearward movement B with respect to the rear of the car body 2, concomitantly therewith the bracket 27 is also deformed to perform the rearward movement B successively from front to rear. In this case, since the front frame 36 of said bracket 27 extends rearwardly downward, when the bracket 27 is deformed to perform the rearward movement B successively from the front, the front frame 36 of the bracket 27 is bent with respect to the rear frame 38 to assume a rearwardly downwardly extending vertical attitude approaching more nearly upright direction.

In this case, since the front end of the front frame 36 is supported by the cross member 10 and its height position is substantially invariable, the more nearly vertical the attitude of the front frame 36 is, the more reliably the portion of the horizontal frame 40 in the vicinity of the rear of the front frame 36 is lowered as at C, and concomitantly therewith, the operative connection gear device 28 supported by the portion of the horizontal frame 40 is lowered as at C.

Thereupon, the steering shaft 23 operatively connected to the operative connection gear device 28 through the universal joint shaft 31 is pulled down together with said steering wheel 24 as shown in alternate long and short dashed lines in FIG. 1, and in FIG. 4, increasing the space dimension between the steering wheel 24 and the driver positioned rearwardly of the steering wheel 24.

Accordingly, the shock to be imparted from the steering wheel 24 to the driver upon secondary collision of the driver with the steering wheel 24 is mitigated by the amount corresponding to the increase in the space dimension.

Further, as described above, the axes 47 and 48 of said output gear 45 and universal joint shaft 32 cross each other in a valley fold manner as seen in a side view (FIG. 1) of the car body 2, and the universal joint shaft 32 is disposed to extend rearwardly upward; for this reason, the following function and effect are produced.

Figure 5:
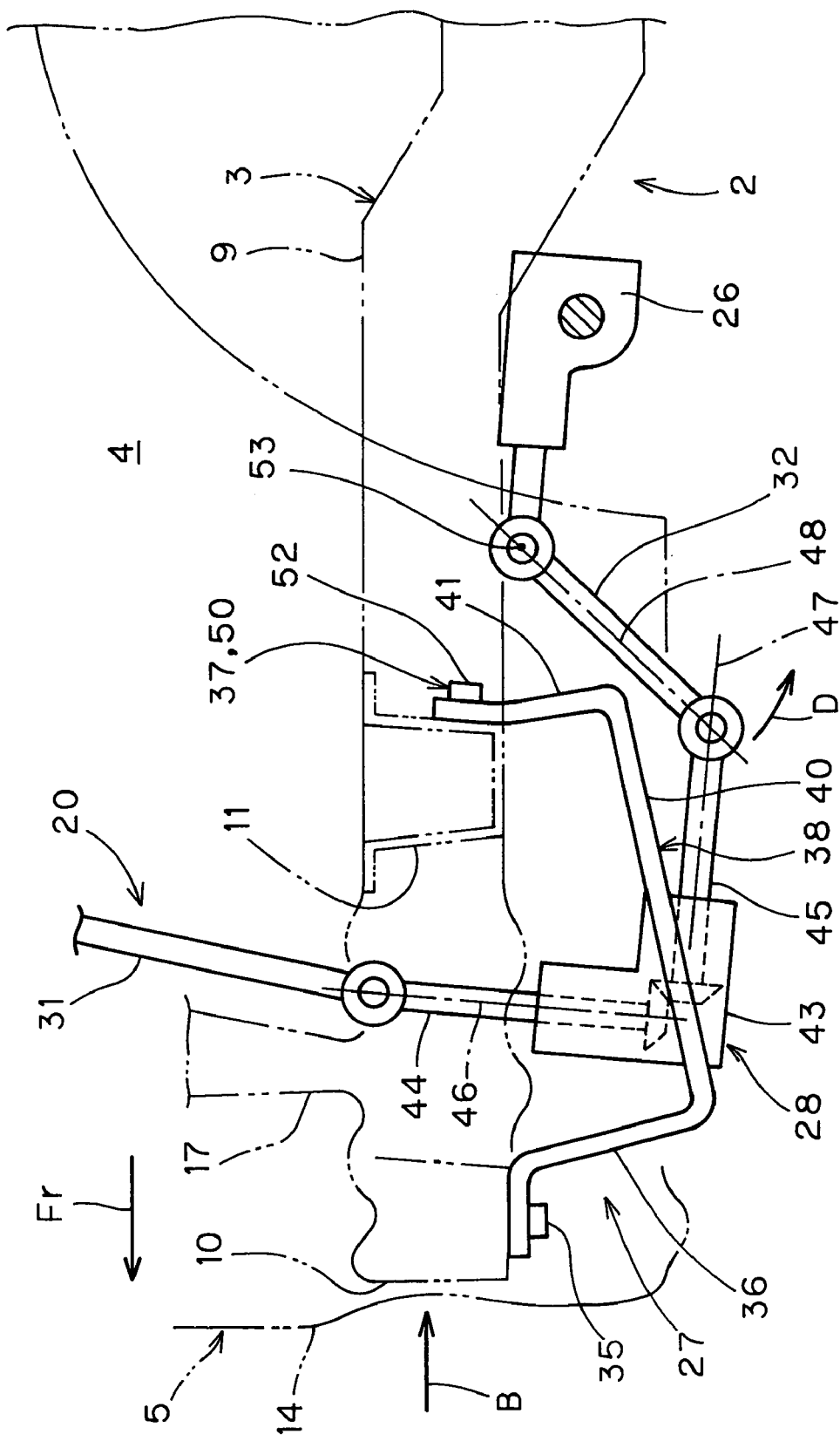
FIG. 5 is a view for explanation of another action, corresponding to fragmental enlargement in FIG. 1.

That is, as shown in FIG. 5, when the primary collision of the automobile 1 progresses to the extent that the front of the car body 2 is deformed to perform the rearward movement B, concomitantly therewith the bracket 27 is caused to perform the rearward movement B as a whole. And concomitantly therewith, the operative connection gear device 28 and another universal joint shaft 32 are successively caused to perform the rearward movement B.

In this case, as described above, the axes 47 and 48 of the output gear 45 and another universal joint shaft 32 cross each other in a valley fold manner as seen in a side view (FIG. 1) of the car body 2, and said another universal joint shaft 32 is disposed to extend rearwardly upward; therefore, the front side of another universal joint shaft 32 performing the rearward movement B, as shown in FIG. 5, is turned as at D rearwardly downward, substantially around the connecting section 53 between the rear end of the universal joint shaft 32 and the steering gear device 26.

Accordingly, the operative connection gear device 28 connected to the front end of said another universal joint shaft 32, together with the front side of said another universal joint shaft 32, is also turned rearwardly downward as at D, substantially around the connecting section 53. Thereupon, the steering shaft 23 operatively connected to the operative connection gear device 28 is pulled down together with the steering wheel 24, and the space dimension between the steering wheel 24 and the driver positioned rearwardly of the steering wheel 24 increases.

Accordingly, the shock to be imparted from the steering wheel 24 to the driver upon secondary collision of the driver with the steering wheel 24 is mitigated by the amount corresponding to the increase in the space dimension.

Further, the dropout accelerating means 50 is provided, which, as describe above, accelerates dropout of the rear end of the bracket 27 from the car body 2 when an external force of more than a predetermined value is applied to the bracket 27 from ahead.

Therefore, when primary collision of the automobile 1 progresses to the extent that the front of the car body 2 is deformed to perform the rearward movement B, the dropout accelerating means 50 causes the rear end of the bracket 27 to drop out downward from another cross member 11 of the car body frame 3 of the car body 2, as shown in alternate long and short dashed lines in FIGS. 2 and 3, so that the horizontal frame 40 of the rear frame 38 is quickly lowered. Further, concomitantly therewith, the operative connection gear device 28 supported by the horizontal frame 40 of the rear frame 38 is also caused to quickly lower.

Thereupon, the steering shaft 23 operatively connected to the operative connection gear device 28 is pulled down together with the steering wheel 24 (in alternate long and short dashed lines in FIGS. 2 and 3), and the space dimension between the steering wheel 24 and the driver positioned rearwardly of the steering wheel 24 increases.

Accordingly, the shock to be imparted from the steering wheel 24 to the driver upon secondary collision of the driver with the steering wheel 24 is more reliably mitigated by the amount corresponding to the increase in the space dimension.

In addition, the above is based on the illustrated example, but the dropout accelerating means 50 may be in the form of notches formed in the side edges of the rear end of the bracket 27 and adapted to act to easily break the rear end upon application of said external force.

What is claimed is:

1. In an automobile steering device comprising a steering shaft (23) disposed in the front of the car interior (4) and supported by the car body (2) for rotation around its own axis (21) extending rearwardly upward, and supporting a steering wheel (24) on the upper end thereof, a steering gear device (26) disposed rearwardly of the lower end of said steering shaft (23), supported by said car body (2) and operatively connected to right and left steering-purpose wheels, and an operative connection gear device (28) disposed forwardly of said steering gear device (26), supported by the car body (2) through a bracket (27) and adapted to operatively connect said steering gear device (26) to the lower end of said steering shaft (23), wherein said operative connection gear device (28) comprises a gear case (43) constituting the outer shell thereof and supported by said rear frame (38), an input gear (44) housed in the gear case (43) and operatively connected to the lower end of the steering shaft (23), and an output gear (45) housed in the gear case (43) and meshing with said input gear (44), a universal joint shaft (32) for operatively connecting said steering gear device (26) to said output gear (45) is provided;

a shock mitigating structure for an automobile steering device, characterized in that said bracket (27) comprises a front frame (36) constituting the front of the bracket (27) and supported at the front end thereof by said car body (2), the rear side thereof extending downwardly rearward, and a rear frame (38) constituting the rear of said bracket (27) and rearwardly extending from the rear end of said front frame (36), the rear end thereof being supported by said car body (2), with said operative connection gear device (28) being supported by the rear frame (38); and further characterized in that the axes (47, 48) of said output gear (45) and universal joint shaft (32) cross each other in a V-shape manner as seen in a side view of the car body (2), and said universal joint shaft (32) is disposed to extend rearwardly upward.

2. A shock mitigating structure for an automobile steering device, as set forth in claim 1, characterized in that a dropout accelerating means (50) is provided for accelerating dropout of the rear end of the bracket (27) from said car body (2) when an external force of more than a predetermined value is applied to the bracket (27) from ahead.

* * * * *